US012737626B2

(12) United States Patent
Chen et al.

(10) Patent No.: US 12,737,626 B2
(45) Date of Patent: Sep. 15, 2026

(54) JOINT INPUT PERTUBATION AND TEMPERATURE SCALING FOR NEURAL NETWORK CALIBRATION

(71) Applicants: International Business Machines Corporation, Armonk, NY (US); National Tsing Hua University, Hsinchu City (TW)

(72) Inventors: Pin-Yu Chen, White Plains, NY (US); I-Hsin Chung, Chappaqua, NY (US); Bo Wu, Cambridge, MA (US); Chuang Gan, Cambridge, MA (US); Tsung-Yi Ho, Hsinchu (TW); Yung-Chen Tang, Hsinchu (TW)

(73) Assignees: International Business Machines Corporation, Armonk, NY (US); National Tsing Hua University, Hsinchu (TW)

( * ) Notice: Subject to any disclaimer, the term of this patent is extended or adjusted under 35 U.S.C. 154(b) by 755 days.

(21) Appl. No.: 18/327,963

(22) Filed: Jun. 2, 2023

(65) Prior Publication Data

US 2024/0403629 A1 Dec. 5, 2024

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS

| | | | |
|---|---|---|---|
| 2022/0230064 | A1 | 7/2022 | Chen et al. |
| 2022/0405570 | A1 | 12/2022 | Vadera et al. |

FOREIGN PATENT DOCUMENTS

| | | | |
|---|---|---|---|
| CN | 102572450 | A | 1/2012 |
| CN | 109887035 | A | 6/2019 |
| CN | 112183751 | A | 1/2021 |
| CN | 112926265 | A1 | 6/2021 |
| CN | 114898164 | A | 8/2022 |
| EP | 3557377 | B1 | 10/2022 |

OTHER PUBLICATIONS

Moosavi-Dezfooli, Seyed-Mohsen, et al. "Universal adversarial perturbations." Proceedings of the IEEE conference on computer vision and pattern recognition. 2017. (Year: 2017).*

(Continued)

*Primary Examiner* — Vincent Gonzales
(74) *Attorney, Agent, or Firm* — Cantor Colburn LLP; Steven Bouknight

(57) ABSTRACT

Some embodiments of the present disclosure are directed to systems, computer-readable media, and computer-implemented methods for neural network calibration. Some embodiments are directed to determining a universal perturbation value and temperature scaling parameter based on a training data set, and processing a testing data set using a neural network by applying the universal perturbation value to the testing data set, and applying the temperature scaling parameter to a plurality of logits determined by the neural network based on the testing data set. Other embodiments may be disclosed or claimed.

20 Claims, 5 Drawing Sheets

(56) References Cited

OTHER PUBLICATIONS

Liang et al., "Improved trainable calibration method for neural networks on medical imaging classification." arXiv preprint arXiv:2009.04057 (2020): 11 pages.
Shafaei et al. "Uncertainty in machine learning: A safety perspective on autonomous driving." In International Conferenceon Computer Safety, Reliability, and Security, Springer International Publishing, (2018): 7 pages.
Charoenphakdee et al., "On focal loss for class-posterior probability estimation: A theoretical perspective," In Proceedings of the IEEE/CVF Conferenceon Computer Vision and Pattern Recognition, (2021) pp. 5202-5211.
Deng et al. "Imagenet: A large-scale hierarchical image database." IEEE conference on computer vision and pattern recognition, (2009):8 pages.
Dosovitskiy et al,. "An image is worth 16×16 words: Transformers for image recognition at scale." arXiv preprint arXiv:2010.11929 (2020): 22 pages.
Esteva et al. "Dermatologist-level classification of skin cancer with deep neural networks." nature 542.7639 (2017): 20 pages.
Guo et al., "On calibration of modern neural networks. In International Conference on Machine Learning," PMLR, (Year: 2017). 14 pages.
Gupta et al. "Calibration of neural networks using splines." arXiv preprint arXiv:2006.12800 (2020): 19 pages.
He et al., "Deep residual learning for image recognition." Proceedings of the IEEE conference on computer vision and pattern recognition, (2016): 9 pages.
Huang et al. "Densely connected convolutional networks." Proceedings of the IEEE conference on computer vision and pattern recognition, (2017): 9 pages.
Jiang et al., "Calibrating predictive model estimates to support personalized medicine." Journal of the American Medical Informatics Association 19.2 (2012): pp. 263-274.
Krizhevsky et al., "Learning multiple layers of features from tiny images." Technical Report (2009): 60 pages.
Kull et al., "Beyond temperature scaling: Obtaining well-calibrated multi-class probabilities with Dirichlet calibration," Advances in neural information processing systems 32 (Year: 2019): 11 pages.
Kumar, Ananya, Percy S. Liang, and Tengyu Ma. "Verified uncertainty calibration." Advances in Neural Information Processing Systems 32 (2019): 12 pages.
Lin et al., "Focal loss for dense object detection." Proceedings of the IEEE international conference on computer vision, (2017): 9 pages.
Minderer et al. "Revisiting the calibration of modern neural networks." Advances in Neural Information Processing Systems 34, (2021):13 pages.
Mukhoti et al., "Calibrating deep neural networks using focal loss." Advances in Neural Information Processing Systems, 33:(Year: 2020): 12 pages.
Müller et al., "When does label smoothing help?" Advances in neural information processing systems 32 (2019):10 pages.
Naeini et al., "Obtaining well calibrated probabilities using bayesian binning." Proceedings of the AAAI conference on artificial intelligence. vol. 29. No. 1. (2015): 7 pages.
Nixon et al. "Measuring Calibration in Deep Learning." CVPR workshops. vol. 2. No. 7. (2019); 4 pages.
Platt, John. "Probabilistic outputs for support vector machines and comparisons to regularized likelihood methods." Advances in large margin classifiers 10.3 (1999): 11 pages.
Tang et al., "Neural Clamping: Joint Input Perturbation and Temperature Scaling for Neural Network Calibration" arXiv preprint arXiv:2209.11604 (Year: 2022), 13 pages.
Tian et al. "A geometric perspective towards neural calibration via sensitivity decomposition." Advances in Neural Information Processing Systems 34 (2021): 12 pages.
Tolstikhin et al., "Mlp-mixer: An all-mlp architecture for vision." Advances in neural information processing systems 34 (2021): 12 pages.
Zagoruyko et al., "Wide residual networks." arXiv preprint arXiv:1605.07146 (2016): pp. 15 pages.

* cited by examiner

Figure 3B:
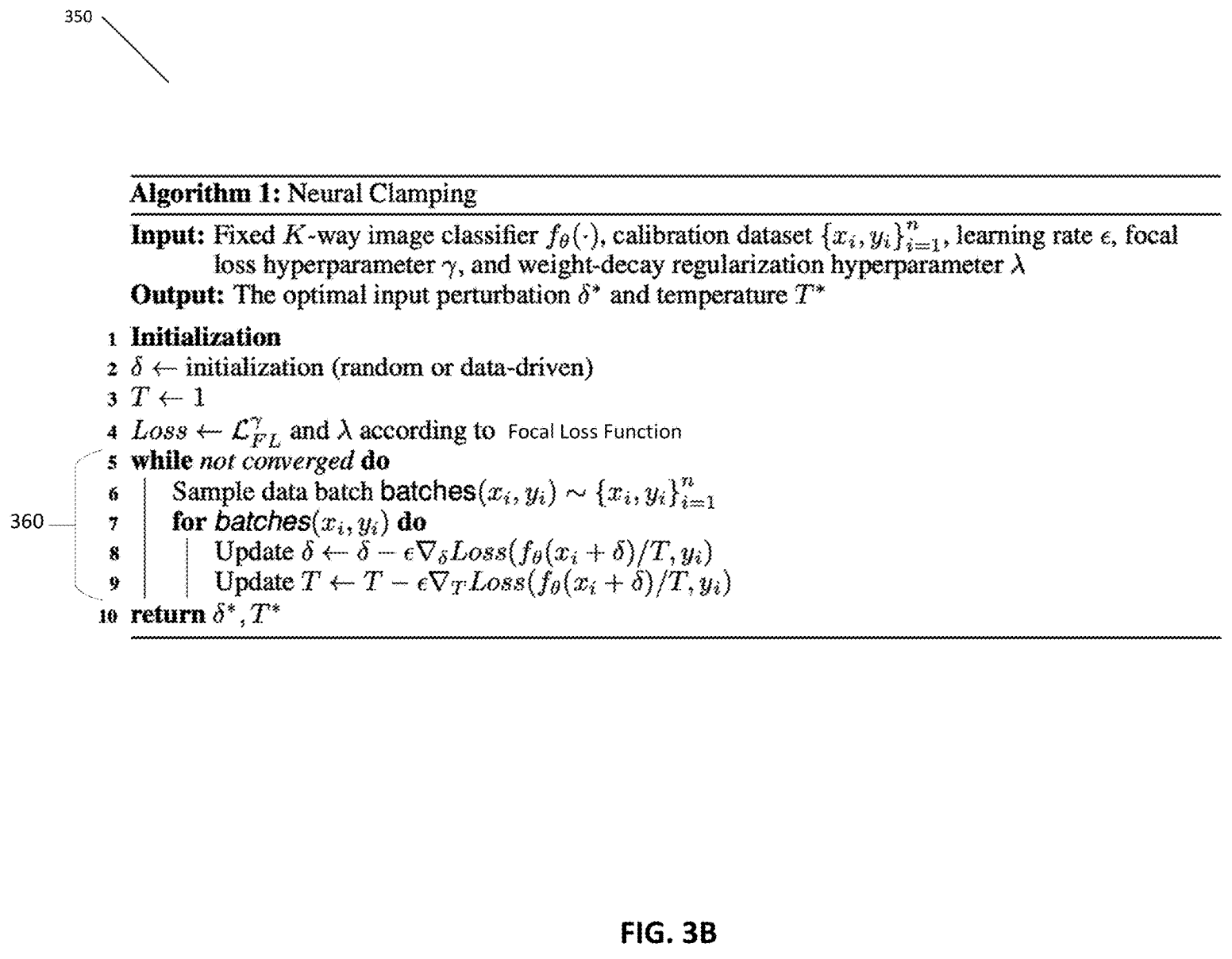

350

Algorithm 1: Neural Clamping

Input: Fixed $K$-way image classifier $f_\theta(\cdot)$, calibration dataset $\{x_i, y_i\}_{i=1}^{n}$, learning rate $\epsilon$, focal loss hyperparameter $\gamma$, and weight-decay regularization hyperparameter $\lambda$

Output: The optimal input perturbation $\delta^*$ and temperature $T^*$

1 Initialization
2 $\delta \leftarrow$ initialization (random or data-driven)
3 $T \leftarrow 1$
4 $Loss \leftarrow \mathcal{L}_{FL}^{\gamma}$ and $\lambda$ according to Focal Loss Function
5 while *not converged* do
6 | Sample data batch batches$(x_i, y_i) \sim \{x_i, y_i\}_{i=1}^{n}$
7 | for *batches*$(x_i, y_i)$ do
8 | | Update $\delta \leftarrow \delta - \epsilon \nabla_\delta Loss(f_\theta(x_i + \delta)/T, y_i)$
9 | | Update $T \leftarrow T - \epsilon \nabla_T Loss(f_\theta(x_i + \delta)/T, y_i)$
10 return $\delta^*, T^*$

JOINT INPUT PERTUBATION AND TEMPERATURE SCALING FOR NEURAL NETWORK CALIBRATION

BACKGROUND

Embodiments of the present invention generally relate to neural network calibration, and more specifically, to computer systems, computer-implemented methods, and computer program products for calibrating neural networks based on joint input perturbation and temperature scaling.

Deep neural networks (DNNs) are machine learning systems that have been widely deployed in applications such as computer vision, natural language processing, and robotics. However, without proper calibration, predictions made by DNN models usually deviate from the true correctness likelihood. The issue of poor calibration in neural networks is further amplified in high-stakes or safety-critical decision-making scenarios requiring accurate uncertainty quantification and estimation, such as disease diagnosis and traffic sign recognition systems in autonomous vehicles. Therefore, calibration plays an important role in trustworthy machine learning systems.

Embodiments of the present invention address these and other issues by providing enhanced methods for neural network calibration.

SUMMARY

Embodiments of the present invention are directed to computer systems, computer-readable media, and computer-implemented methods for calibrating neural networks based on joint input perturbation and temperature scaling. One exemplary embodiment includes a computer system comprising a processor and a memory coupled to the processor. The memory stores instructions that, when executed by the processor, cause the computer system to retrieve a calibration training data set for a neural network that includes a plurality of data samples stored in an electronic file format and determine, based on the calibration training data set, a universal perturbation value associated with the plurality of data samples. The memory further stores instructions to cause the computer system to determine a neural network classifier for a plurality of classes based on the plurality of data samples and to determine a plurality of logits based on the neural network classifier, the plurality of logits including a respective logit associated with each respective class from the plurality of classes. The memory further stores instructions to cause the computer system to determine, based on the plurality of logits and the universal perturbation value, a temperature scaling parameter associated with the plurality of classes and to determine a respective probability score for each respective class in the plurality of classes based on the plurality of logits. The memory further stores instructions to cause the computer system to process, using the neural network, a testing data set that includes a plurality of data samples stored in the electronic file format to generate a respective calibrated probability score for each respective class in the plurality of classes, wherein processing the testing data set includes applying the universal perturbation value to the testing data set, and applying the temperature scaling parameter to the plurality of logits determined by the neural network based on the testing data set.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3B illustrates an example of an algorithm for training a neural network model in accordance with various embodiments of the disclosure.

DETAILED DESCRIPTION

Figure 1:
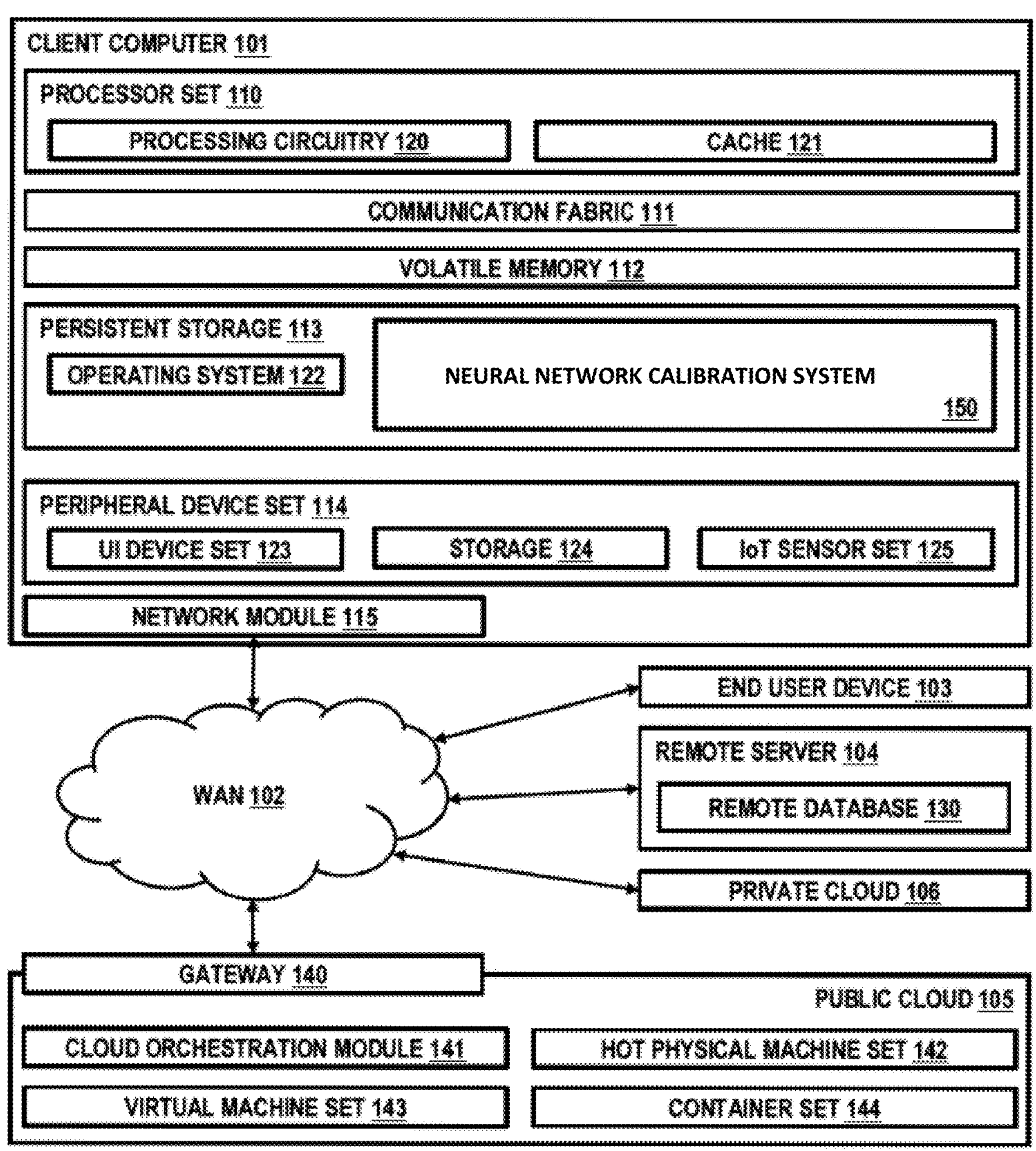
FIG. 1 depicts a block diagram of an example computer system for use in conjunction with one or more embodiments of the present invention.

Disclosed herein are methods, systems, and computer program products for neural network calibration. Among other things, embodiments of the present disclosure can determine a perturbation calibration parameter to apply to the input to a neural network model, and a temperature scaling parameter to apply to the output of the model. In this manner, embodiments of the present disclosure help calibrate neural networks more effectively and completely than in conventional systems, thereby improving the level of accuracy of machine-learning-based systems.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums" or "computer-readable mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as a neural network calibration system 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
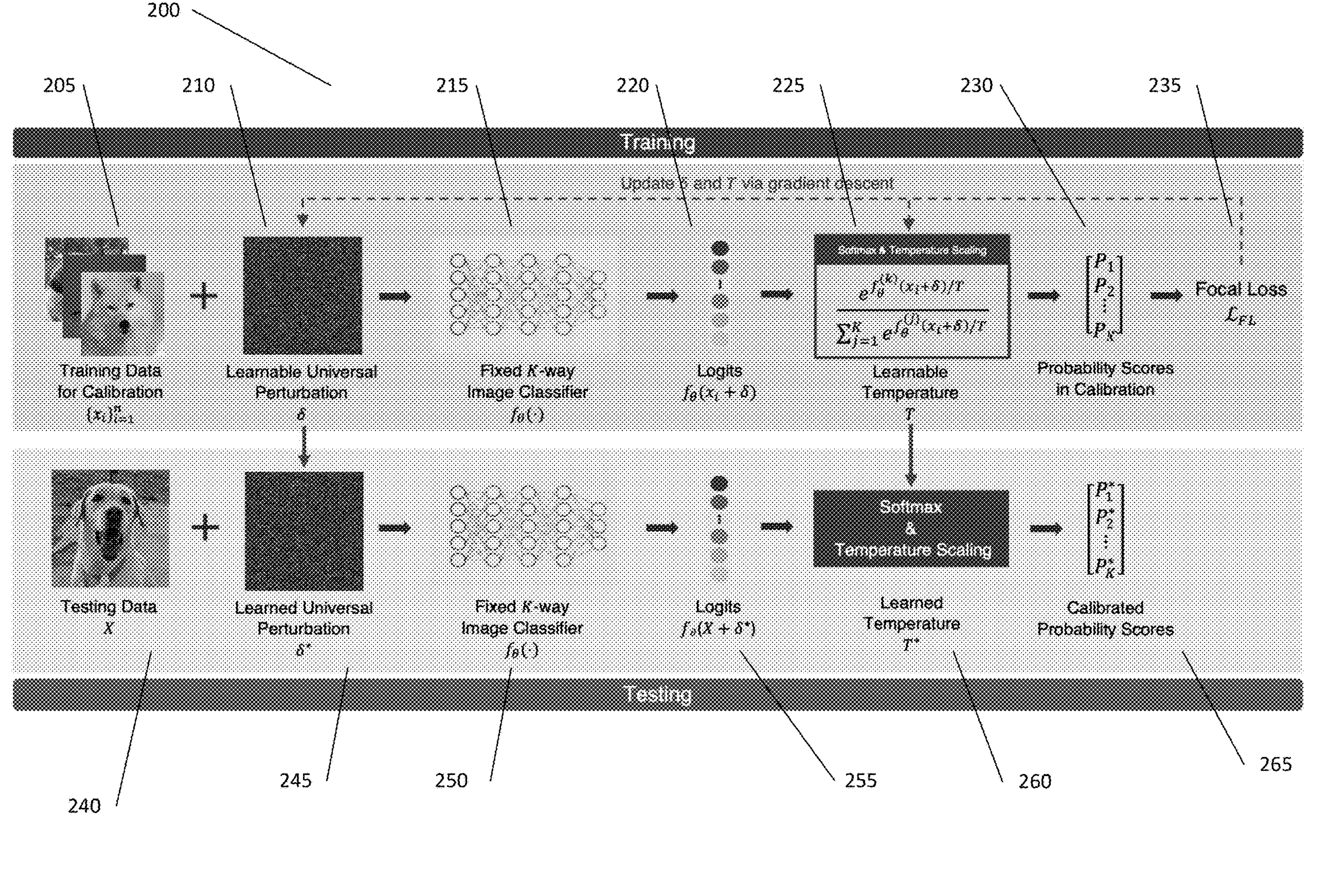
FIG. 2 is a functional block diagram illustrating an example of neural network calibration in accordance with one or more embodiments of the present invention.

Referring now to FIG. 2, a functional block diagram of a process 200 illustrating an overview example of neural network calibration in accordance with one or more embodiments of the present invention is shown. In some exemplary embodiments, the process 200 illustrated in FIG. 2 may be performed by the neural network calibration system 150 depicted in FIG. 1.

Embodiments of the present disclosure, such as the process 200 presented in FIG. 2, provide enhanced post-processing calibration for neural networks. Some embodiments disclosed herein may refer to such post-processing calibration as "neural clamping" because its methodology is based on learning a joint input-output transformation for calibrating a pre-trained (fixed) neural network classifier. As the neural network calibration processes of the present disclosure are performed post-processing, they do not require changing the parameters of the model.

As described in more detail below, to realize joint input-output calibration, the neural clamping procedures of the present disclosure adds a trainable universal perturbation (δ) to every data input and a trainable temperature scaling parameter (T) at the output logits. These parameters are jointly learned by minimizing the focal loss with a weight-decay regularization term evaluated on a calibration training data set. The focal loss assigns a non-uniform importance to the calibration training data set during training and includes a cross entropy loss as a special case. During the testing phase using the neural network model, the neural clamping processes of the present disclosure appends optimized calibration parameters (δ* and T*) to the input and output of the fixed classifier, respectively.

In the example depicted in FIG. 2, process 200 includes, at step 205, retrieving a calibration training data set. In this example, the calibration training data set includes a plurality of data samples comprising electronically-stored images of various dogs along with text descriptions (e.g., in a label associated with an image or in metadata stored with the image) indicating each image is of a dog. The calibration training data set is represented in FIG. 2 as:

$$\{x_i, y_i\}_{i=1}^n.$$

At step 210, the system 150 determines a universal perturbation value (δ) for the plurality of data samples. To realize joint input-output calibration, the system 150 appends the universal perturbation value to the model input and a learnable temperature scaling parameter (T) for all classes at the model output. In contrast to conventional output calibration procedures, the embodiments of the present disclosure introduce input calibration by applying trainable transformations on the data inputs prior to feeding them to the model. In embodiments, the input calibration is the universal additive perturbation value δ, therefore, temperature scaling is included as a special case when setting δ=0.

At step 215, the system 150 determines a neural network classifier for a plurality of classes associated with the model. For example, the input is a data sample (e.g. image, text embedding, audio), and the output is the class prediction over the input over K classes. In the specific example shown in FIG. 2 (pertaining to images of dogs), a cat vs. dog image classifier is a two-class classifier.

The steps of the process 200 in FIG. 2 are presented in conjunction with examples of mathematical functions. In alternate embodiments, other relationships may be possible. In this example, given pre-trained model F(•), for each input image x from the calibration training data set (of images 1 to n) the input perturbation is δ and output temperature T.

At step 220, the system 150 determines logits (which are classification-related internal data representations in the neural network) based on the neural network classifier. The relationship between the logits with respect to the universal perturbation value δ, output temperature scaling parameter T, and input image x may be represented as: Logits=F(x+δ)/T.

At step 225, the system 150 applies an activation function to the logits (known as a "softmax" function) to determine probability scores (at step 230) over K classes. In some embodiments, the probability scores determined at step 230 are each between 0 and 1 and together sum to 1. The temperature T is a scaling factor associated with the Logits, and affects the softmax output through the mathematical definition defined above.

At step 235, the system 150 uses a focal loss function to determine an optimal universal perturbation value (δ*) to apply to the testing data set and an optimal temperature scaling parameter (T*) to apply to the plurality of logits determined by the neural network based on the testing data set. In some embodiments, given a calibration training set $$\{x_i, y_i\}_{i=1}^n,$$

the optimal calibration parameters δ* and T* are obtained by performing a focal loss function represented by:

$$\delta^*, T^* = \underset{\delta,T}{\operatorname{argmin}} \sum\nolimits_{i=1}^n \mathcal{L}_{FL}^{\gamma}\left(\frac{f_\theta(x_i+\delta)}{T}, y_i\right) + \lambda\|\delta\|_2^2.$$

Where:

δ=input perturbation;

T=temperature;

n=number of samples in the calibration dataset for training;

L=a loss function;

fθ=a neural network classifier that outputs the logits to be calibrated;

x_i=the sample x_i in the calibration dataset;

y_i=the label of x_i;

$\mathcal{L}$=a tuning parameter; and $$\lambda\|\delta\|_2^2 = \text{a squared } L2 \text{ norm penalty function on delta.}$$

Figure 3A:
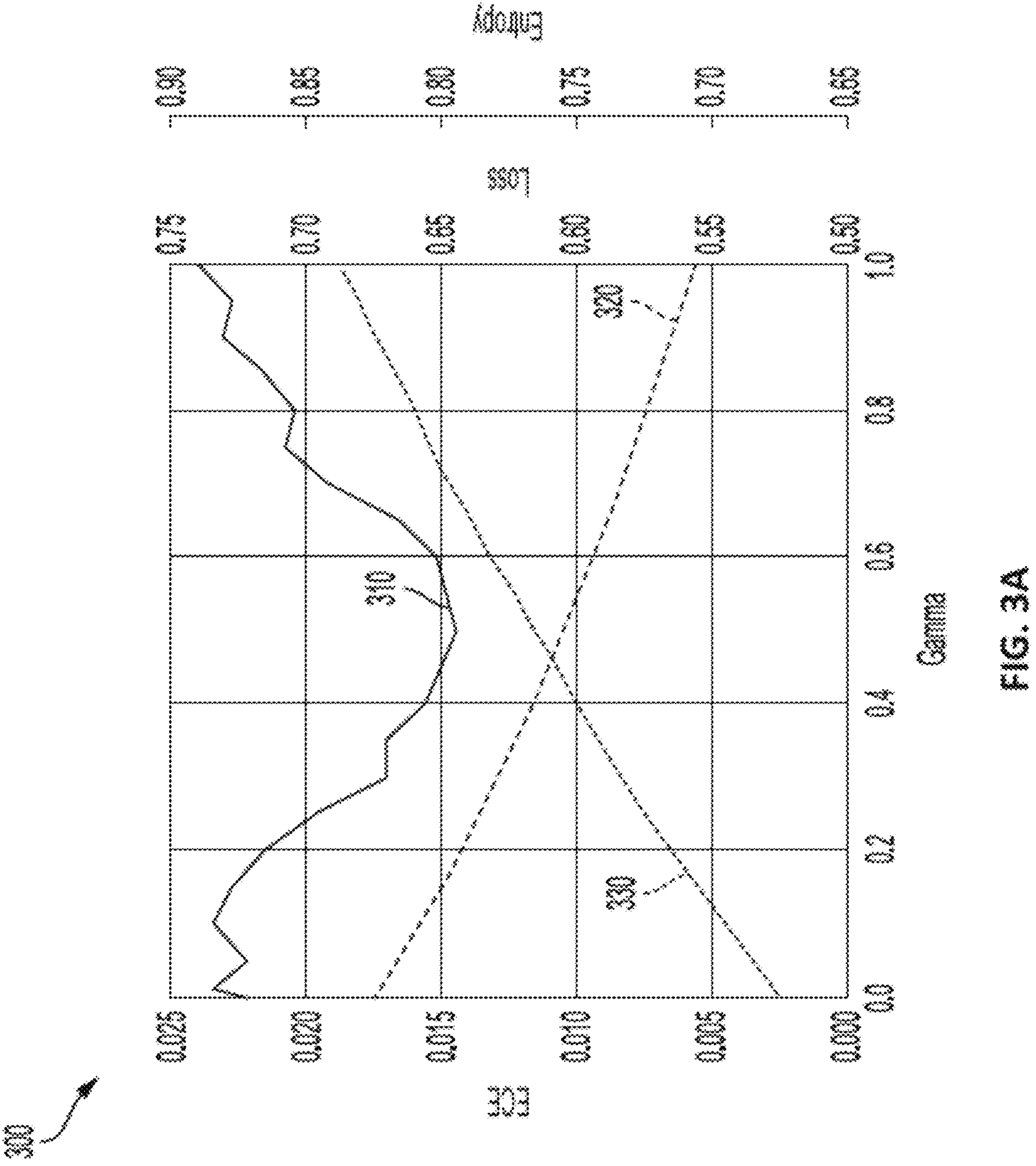
FIG. 3A is a graph illustrating an example of relationships between a focal loss hyperparameter (gamma) with respect to an expected calibration error (ECE) and entropy in accordance with various embodiments of the disclosure.

In the example of the focal loss function described above, γ (gamma) represents a focal loss hyperparameter governing the assigned importance of each data sample in the aggregated loss, while λ (lambda) is a weight-decay regularization hyperparameter. FIG. 3A is a graph 300 showing an example of plots of focal loss relative to plots of expected calibration error (ECE) and entropy. The ECE is a calibration metric that reflects a difference between confidence and accuracy of the model of the neural network. Some embodiments may alternately operate in conjunction with adaptive expected calibration error (AECE), as well as static calibration error (SCE). Entropy is a measure of randomness or disorder in the data set being processed by the neural network. In some embodiments, entropy can be evaluated by the system 150 using prediction probability scores provided by the neural network.

In the example shown in FIG. 3A, the plot ECE is represented by line 310, focal loss by line 320, and entropy by line 330, for an exemplary neural network model trained on a sample dataset in accordance with various embodiments of the present disclosure. In this example, while entropy continues to increase as the γ (gamma) value increases, ECE attains its minimum at some intermediate gamma value and is better than the ECE in using cross entropy loss ($\gamma=0$).

In some embodiments, the system 150 may select the best γ (gamma) and λ (lambda) values that minimize ECE of the calibration dataset from a candidate pool of γ and λ values with separate runs. In some embodiments, the universal perturbation value (the input calibration parameter δ) and the temperature scaling parameter (the output calibration parameter T) are optimized using the stochastic gradient descent (SGD) optimizer.

An example of an algorithm 350 for training a neural network model as shown in steps 205-235 of FIG. 2 is illustrated in FIG. 3B. In this example, the algorithm loops, at 360, to process each data sample in the calibration training data set until convergence based on the focal loss function described above. Within loop 360, the system 150 updates the universal perturbation value (δ) and the temperature scaling parameter (T) using a gradient of focal loss function with a step size of ε.

At step 240-265 of FIG. 2, a testing data set is processed using the optimal universal perturbation value applied to the input of the model and the optimal temperature scaling parameter applied to the output of the model. In particular, a testing data input is received at step 240, and the optimal universal perturbation value is appended to the testing data input at step 245.

At steps 250 and 255 the testing data input is passed through the model of the neural network as described above with reference to steps 215 and 220. At step 260, the system 150 appends the optimal temperature scaling parameter to the softmax output of logits of the testing data input. The calibrated probability scores based on the testing data input are obtained at step 265.

Figure 4:
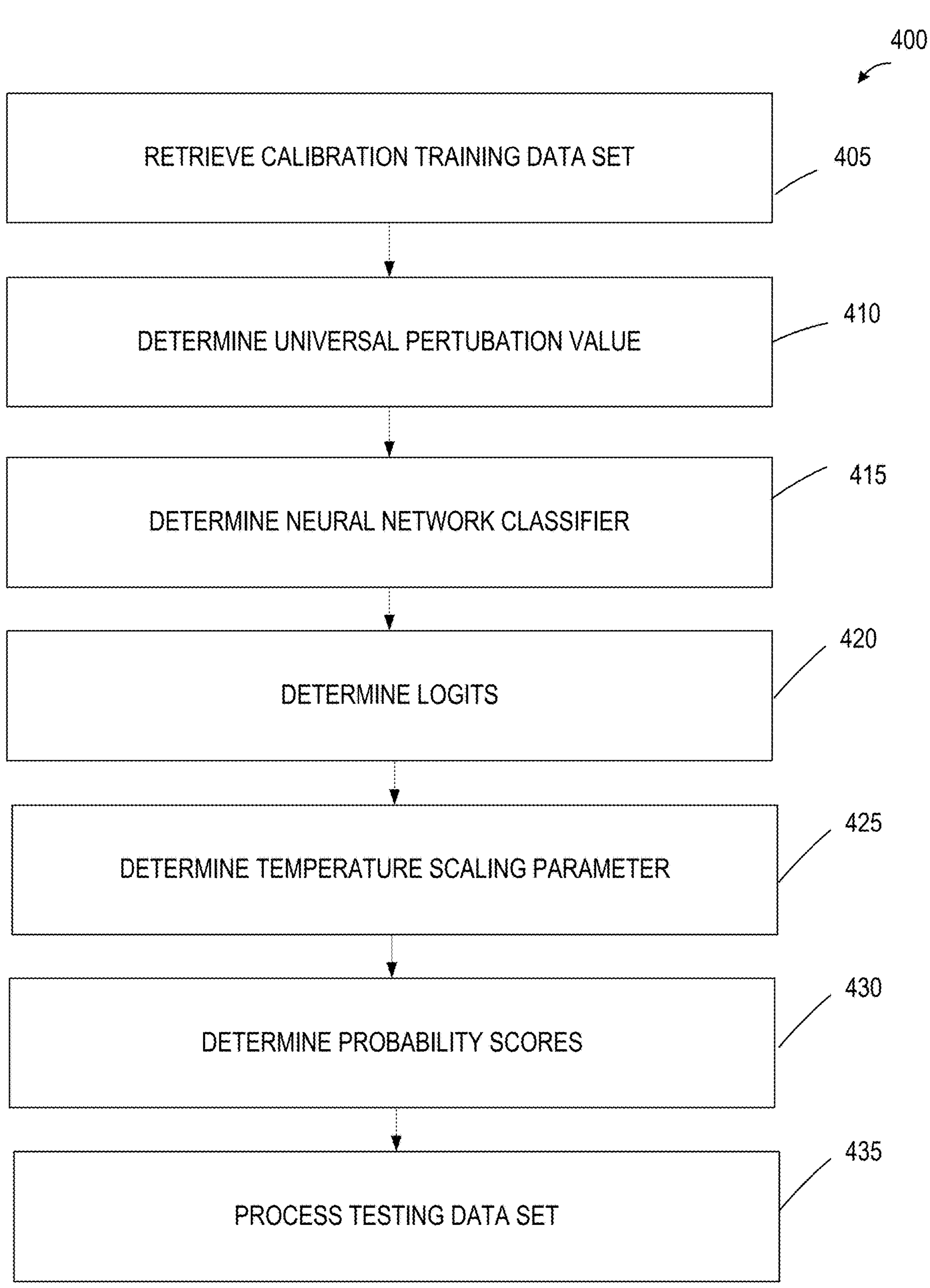
FIG. 4 is a flowchart of a method for retrieving queries in a system for storing and retrieving queries by content in accordance with one or more embodiments of the present invention.

FIG. 4 illustrates an example of a process for neural network calibration in accordance with various embodiments of the present disclosure. Process 400 may be performed by any suitable system or combination of systems, such as neural network calibration system 150 in FIG. 1. In this example, process 400 includes, at 405, retrieving a calibration training data set for a neural network. In some embodiments, the calibration training data set includes a plurality of data samples stored in an electronic file format.

Process 400 further includes, at 410, determining a universal perturbation value. In some embodiments, the universal perturbation value is determined based on the calibration training data set and is associated with the plurality of data samples. Process 400 further includes, at 415, determining a neural network classifier. The neural network classifier may be associated with a plurality of classes based on the plurality of data samples.

Process 400 further includes, at 420, determining a plurality of logits based on the neural network classifier. In some embodiments, the plurality of logits include a respective logit associated with each respective class from the plurality of classes. The process 400 further includes, at 425, determining a temperature scaling parameter. The temperature scaling parameter may be associated with the plurality of classes and may be determined based on the plurality of logits and the universal perturbation value. Process 400 further includes at 430, determining a respective probability score for each respective class in the plurality of classes based on the plurality of logits.

Process 400 further includes, at 435, processing a testing data set using the neural network. In some embodiments, the system 150 may process, using the neural network, a testing data set that includes a plurality of data samples stored in an electronic file format to generate a respective calibrated probability score for each respective class in the plurality of classes. In some embodiments, processing the testing data set includes applying the universal perturbation value to the testing data set, and applying the temperature scaling parameter to a plurality of logits determined by the neural network based on the testing data set.

Embodiments of the present disclosure may operate in conjunction with testing and training data stored in a variety of different electronic formats. In some embodiments, one or more of the training data set and the testing data set includes a data sample comprising at least one of: text, an image, audio, and video.

In some embodiments, applying the universal perturbation value to the testing data set and applying the temperature scaling parameter to the plurality of logits determined by the neural network based on the testing data set includes using a focal loss function to determine an optimal universal perturbation value to apply to the testing data set and an optimal temperature scaling parameter to apply to the plurality of logits determined by the neural network based on the testing data set. In some embodiments, using the focal loss function includes determining a focal loss hyperparameter associated with a level of importance of each data sample in the plurality of data samples to an aggregated loss value.

In some embodiments, the focal loss hyperparameter is determined to minimize an expected calibration error (ECE) associated with the calibration training data set. In some embodiments, The focal loss hyperparameter may be based on an adjusted cross-entropy loss and a modulating factor. In some embodiments, the focal loss hyperparameter is based on a weight-decay regularization term associated with the calibration training data set.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer system comprising:

a processor; and a memory coupled to the processor and storing instructions that, when executed by the processor, cause the computer system to:

retrieve a calibration training data set for a neural network that includes a plurality of data samples stored in an electronic file format;

determine, based on the calibration training data set, a universal perturbation value associated with the plurality of data samples;

determine a neural network classifier for a plurality of classes based on the plurality of data samples;

determine a plurality of logits based on the neural network classifier, the plurality of logits including a respective logit associated with each respective class from the plurality of classes;

determine, based on the plurality of logits and the universal perturbation value, a temperature scaling parameter associated with the plurality of classes;

determine a respective probability score for each respective class in the plurality of classes based on the plurality of logits; and process, using the neural network, a testing data set that includes the plurality of data samples stored in the electronic file format to generate a respective calibrated probability score for each respective class in the plurality of classes, wherein processing the testing data set includes applying the universal perturbation value to the testing data set, and applying the temperature scaling parameter to the plurality of logits determined by the neural network based on the testing data set.

2. The computer system of claim 1, wherein one or more of the training data set and the testing data set includes a data sample comprising at least one of: text, an image, audio, and video.

3. The computer system of claim 1, wherein applying the universal perturbation value to the testing data set and applying the temperature scaling parameter to the plurality of logits determined by the neural network based on the testing data set includes using a focal loss function to determine an optimal universal perturbation value to apply to the testing data set and an optimal temperature scaling parameter to apply to the plurality of logits determined by the neural network based on the testing data set.

4. The computer system of claim 3, wherein using the focal loss function includes determining a focal loss hyperparameter associated with a level of importance of each data sample in the plurality of data samples to an aggregated loss value.

5. The computer system of claim 4, wherein the focal loss hyperparameter is determined to minimize an expected calibration error (ECE) associated with the calibration training data set.

6. The computer system of claim 4, wherein the focal loss hyperparameter is based on an adjusted cross-entropy loss and a modulating factor.

7. The computer system of claim 4, wherein the focal loss hyperparameter is based on a weight-decay regularization term associated with the calibration training data set.

8. A computer-readable medium storing instructions that, when executed by a computer system, cause the computer system to:

retrieve a calibration training data set for a neural network that includes a plurality of data samples stored in an electronic file format;

determine, based on the calibration training data set, a universal perturbation value associated with the plurality of data samples;

determine a neural network classifier for a plurality of classes based on the plurality of data samples;

determine a plurality of logits based on the neural network classifier, the plurality of logits including a respective logit associated with each respective class from the plurality of classes;

determine, based on the plurality of logits and the universal perturbation value, a temperature scaling parameter associated with the plurality of classes;

determine a respective probability score for each respective class in the plurality of classes based on the plurality of logits; and process, using the neural network, a testing data set that includes the plurality of data samples stored in the electronic file format to generate a respective calibrated probability score for each respective class in the plurality of classes, wherein processing the testing data set includes applying the universal perturbation value to the testing data set, and applying the temperature scaling parameter to the plurality of logits determined by the neural network based on the testing data set.

9. The computer-readable medium of claim 8, wherein one or more of the training data set and the testing data set includes a data sample comprising at least one of: text, an image, audio, and video.

10. The computer-readable medium of claim 8, wherein applying the universal perturbation value to the testing data set and applying the temperature scaling parameter to the plurality of logits determined by the neural network based on the testing data set includes using a focal loss function to determine an optimal universal perturbation value to apply to the testing data set and an optimal temperature scaling parameter to apply to the plurality of logits determined by the neural network based on the testing data set.

11. The computer-readable medium of claim 10, wherein using the focal loss function includes determining a focal loss hyperparameter associated with a level of importance of each data sample in the plurality of data samples to an aggregated loss value.

12. The computer-readable medium of claim 11, wherein the focal loss hyperparameter is determined to minimize an expected calibration error (ECE) associated with the calibration training data set.

13. The computer-readable medium of claim 11, wherein the focal loss hyperparameter is based on an adjusted cross-entropy loss and a modulating factor.

14. The computer-readable medium of claim 11, wherein the focal loss hyperparameter is based on a weight-decay regularization term associated with the calibration training data set.

15. A computer-implemented method comprising:

retrieving, by a computer system, a calibration training data set for a neural network that includes a plurality of data samples stored in an electronic file format;

determining, by the computer system, based on the calibration training data set, a universal perturbation value associated with the plurality of data samples;

determining, by the computer system, a neural network classifier for a plurality of classes based on the plurality of data samples;

determining, by the computer system, a plurality of logits based on the neural network classifier, the plurality of logits including a respective logit associated with each respective class from the plurality of classes;

determining, by the computer system, based on the plurality of logits and the universal perturbation value, a temperature scaling parameter associated with the plurality of classes;

determining, by the computer system, a respective probability score for each respective class in the plurality of classes based on the plurality of logits; and processing, by the computer system using the neural network, a testing data set that includes the plurality of data samples stored in the electronic file format to generate a respective calibrated probability score for each respective class in the plurality of classes, wherein processing the testing data set includes applying the universal perturbation value to the testing data set, and applying the temperature scaling parameter to the plurality of logits determined by the neural network based on the testing data set.

16. The computer-implemented method of claim 15, wherein one or more of the training data set and the testing data set includes a data sample comprising at least one of: text, an image, audio, and video.

17. The computer-implemented method of claim 15, wherein applying the universal perturbation value to the testing data set and applying the temperature scaling parameter to the plurality of logits determined by the neural network based on the testing data set includes using a focal loss function to determine an optimal universal perturbation value to apply to the testing data set and an optimal temperature scaling parameter to apply to the plurality of logits determined by the neural network based on the testing data set.

18. The computer-implemented method of claim 17, wherein using the focal loss function includes determining a focal loss hyperparameter associated with a level of importance of each data sample in the plurality of data samples to an aggregated loss value, wherein the focal loss hyperparameter is determined to minimize an expected calibration error (ECE) associated with the calibration training data set.

19. The computer-implemented method of claim 18, wherein the focal loss hyperparameter is based on an adjusted cross-entropy loss and a modulating factor.

20. The computer-implemented method of claim 18, wherein the focal loss hyperparameter is based on a weight-decay regularization term associated with the calibration training data set.

* * * * *